B. E. CARRM.
CONVERTIBLE AUTOMOBILE BODY.
APPLICATION FILED JAN. 4, 1918. RENEWED MAY 12, 1921.
1,405,486
Patented Feb. 7, 1922.
5 SHEETS—SHEET 4.
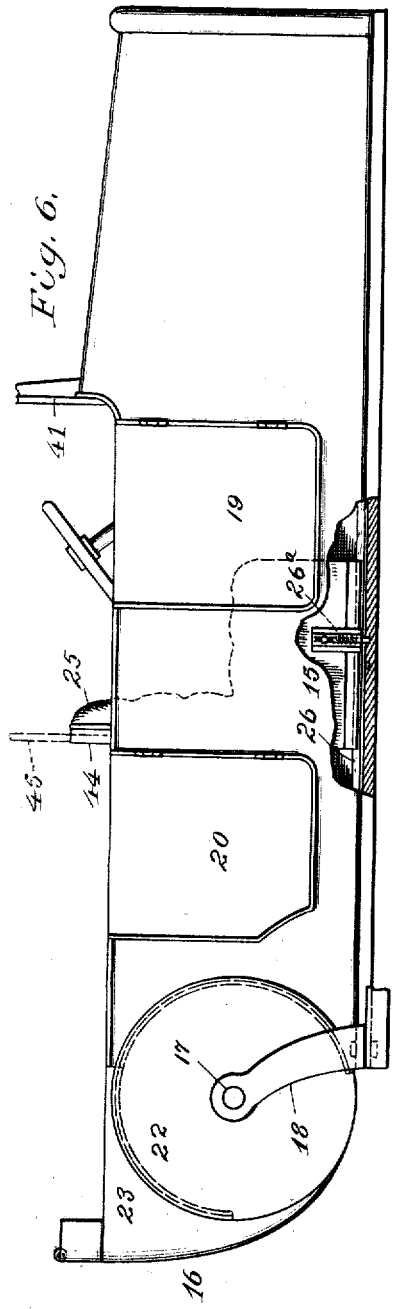
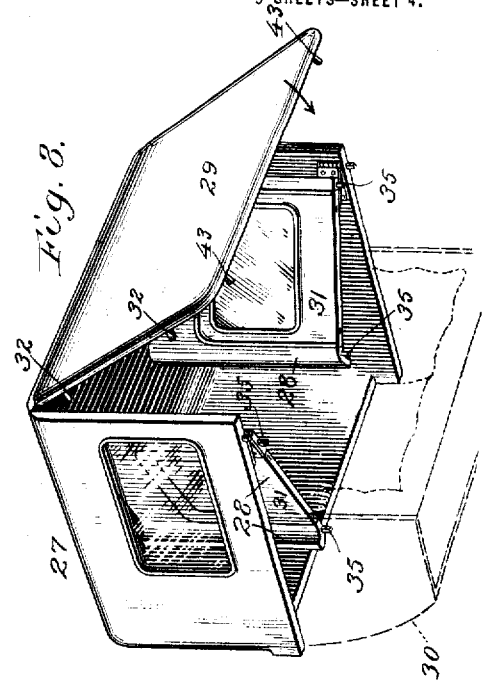
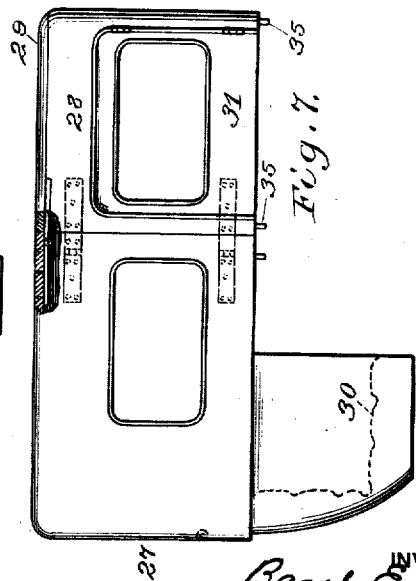
INVENTOR
Bazel E. Carrm
BY
Conrad A. Dieterich
his ATTORNEY

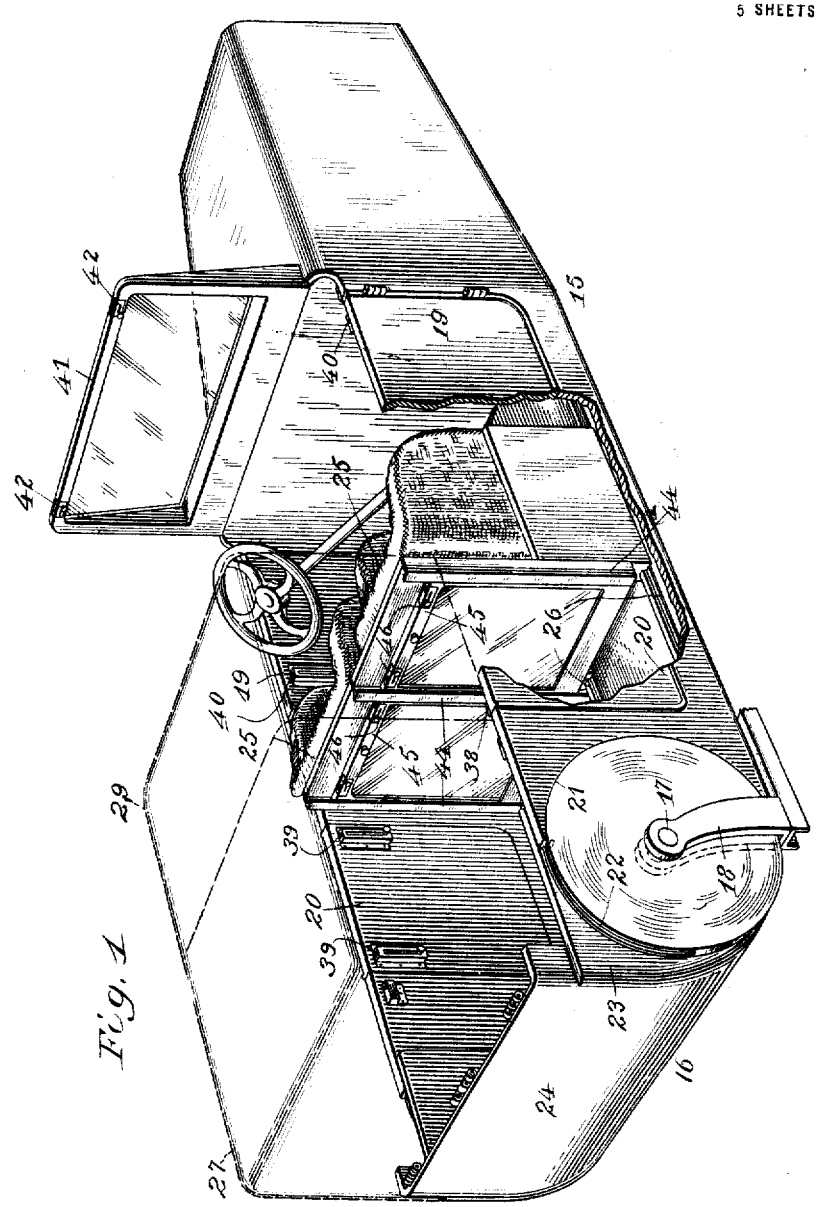

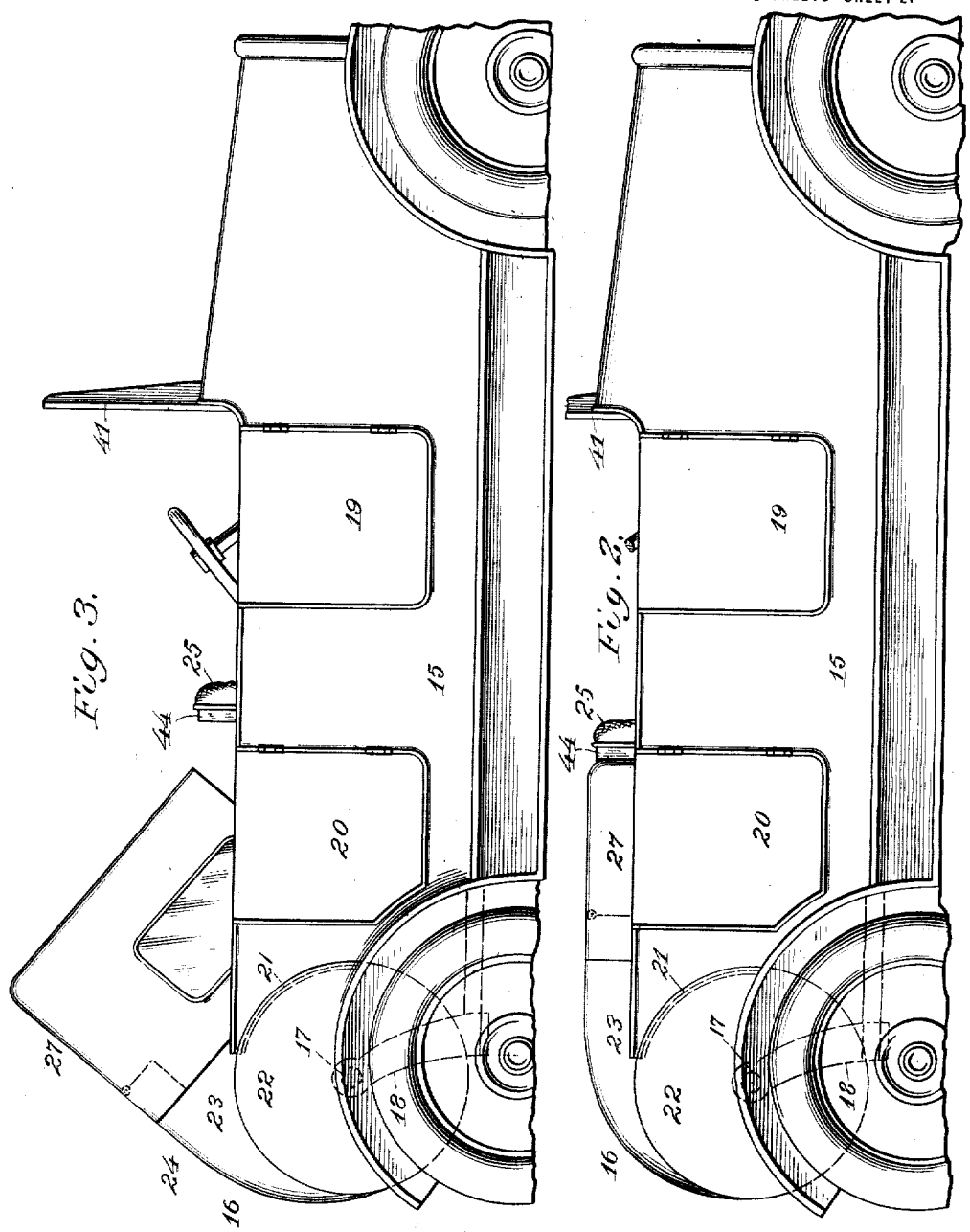

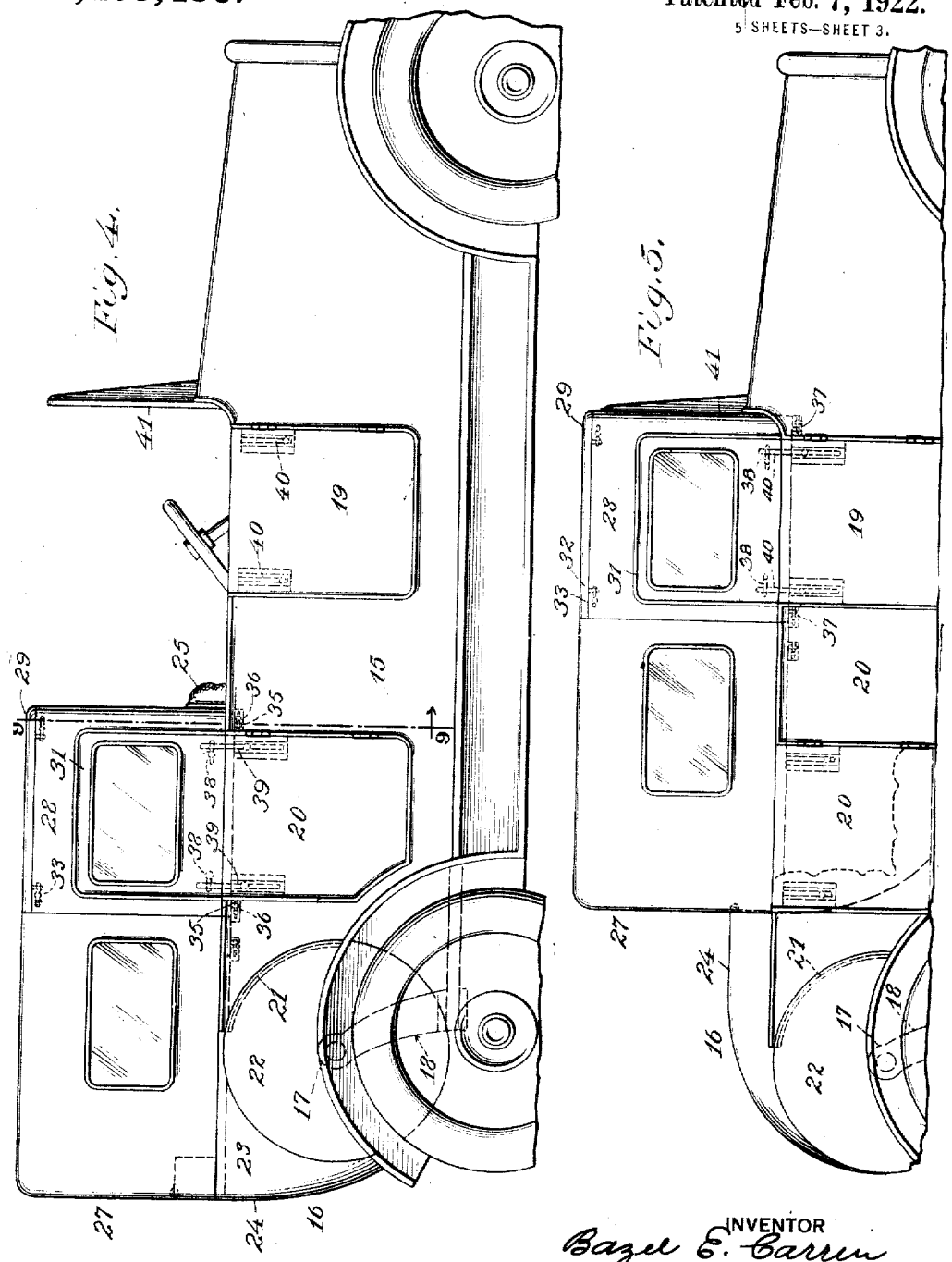

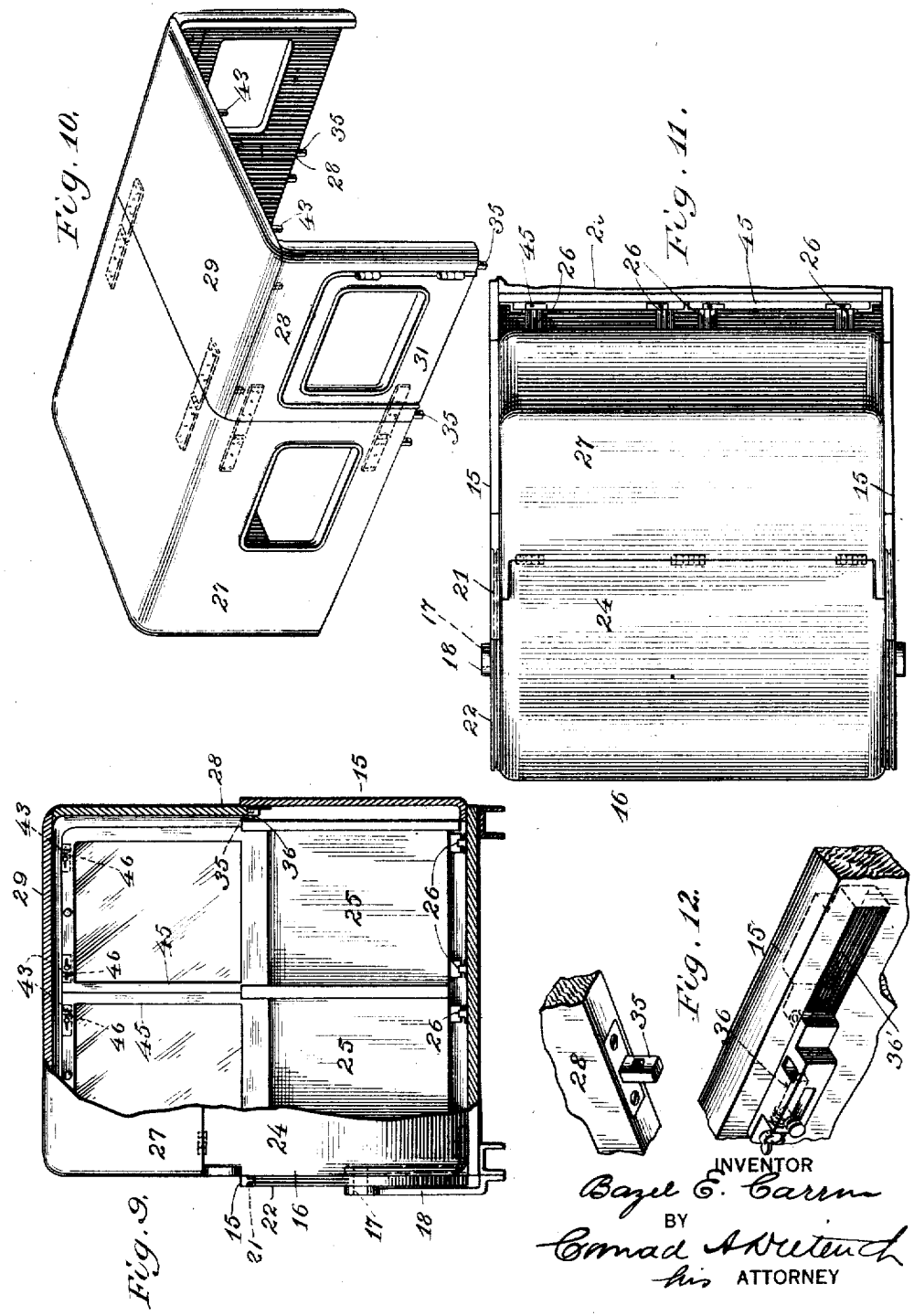

UNITED STATES PATENT OFFICE.

BAZEL E. CARRM, OF NEW YORK, N. Y.

CONVERTIBLE AUTOMOBILE BODY.

1,405,486. Specification of Letters Patent. Patented Feb. 7, 1922.

Application filed January 4, 1918, Serial No. 210,284. Renewed May 12, 1921. Serial No. 469,034.

*To all whom it may concern:*

Be it known that I, BAZEL E. CARRM, residing at the city of New York, borough of Manhattan, in the county and State of New York, have invented certain new and useful Improvements in Convertible Automobile Bodies, of which the following is a full, clear, and exact specification.

This invention relates to improvements in convertible automobile bodies for use in connection with automobiles for the accommodation of passengers, and has for its object to provide a body which may quickly and readily be converted into any one of a plurality of types or styles.

Further, the invention has for its object, to provide an automobile body which may be so adjusted at will as to convert the automobile, into a landaulet, a coupé or a runabout.

Further, the invention has for its object, to provide an automobile body comprising a fixed main section, a rotatable rear section, and a top secured to the rear section and adapted to occupy an operative or an inoperative position.

Further, the invention has for its object, to provide an automobile body comprising a fixed main section, a rotatable rear section, and a top secured to the rear section and adapted to act as an enclosure for the passengers when the automobile is used as a coupé or landaulet, or to be folded within the main section when the automobile is used as a runabout.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

Referring to the drawings, which show an illustrative embodiment of the invention;

Figure 1 is a perspective ew, partly broken away and in section. howing one form of automobile body constructed according to and embodying the invention;

Fig. 2 is a view in side elevation showing the body adjusted for use as a runabout;

Fig. 3 is a similar view showing the top partly raised in the course of adjustment for use as a landaulet;

Fig. 4 is a similar view showing the body adjusted for use as a landaulet;

Fig. 5 is a similar view showing the body adjusted for use as a coupé;

Fig. 6 is a detail side elevation, partly broken away, showing the movable seat and the means for securing the same in position;

Fig. 7 is a detail view of the top detached from the main body;

Fig. 8 is a detail perspective view of the top, partly folded preparatory to lowering the same into the main body when the vehicle is to be used as a runabout;

Fig. 9 is a rear view, partly broken away, looking forward within the body;

Fig. 10 is a detail, detached, perspective view of the top;

Fig. 11 is a detail plan showing the top in substantially the position illustrated in Fig. 3, and Fig. 12 is a detail, perspecive view showing the general form of the co-operative locking members.

Referring to the drawings, the automobile body, which may be mounted upon a chassis of any approved construction, comprises a stationary main section 15, and a rotatable rear section 16, provided with pivots 17 mounted in the upper ends of brackets 18, the lower ends of which are secured to the chassis. Hinged to the side walls of the main section 15, which extend substantially throughout the length thereof, are front doors 19, and rear doors 20. The front doors 19 afford access to the front seats when the car is used in any of the forms, and the rear doors 20 afford access to the enclosed rear compartment when the car is used as a landaulet.

At their rear ends the side walls of the main section 15 are provided with arc-shaped, grooved recesses 21, which are engaged by peripheral tongues on the circular, outwardly extending portions 22 of the side walls 23 of the rotatable rear section 16 of the body, thereby forming a rotatable joint between the two sections 15 and 16 of the body. The outer surfaces of the circular side members 22 of the side walls 23 of the rear section 16 are substantially flush with the outer surfaces of the side walls of the main section 15, and the outer surfaces of the side walls 23 are substantially flush with the inner surfaces of the side walls of the main section 15. The rear wall 24 of the rear section 16 is curved, as shown, so that, when the rear section 16 is rotated into the position it occupies when the automobile is used as a runabout or coupé, as shown in Figs. 2 and 5, the body will have the appearance and form of the so-called "turtleback" type of body.

The main section 15 is provided with seats 25, mounted upon rails 26, extending longitudinally of the automobile body, thereby permitting forward and rearward movement of the seats 25. Suitable fastening means, such as spring-pressed bolts 26ª carried by the seats 25 engage recesses in the floor of the automobile body to hold the seats 25 to their adjusted positions.

Pivotally secured to the rear wall 24 of the rear section 16, adjacent the upper edge thereof, is a top comprising a main top portion 27, to the front edges of the sides and roof of which are hinged inwardly-folding side portions 28, and a downwardly folding roof portion 29. Secured to the rear wall of the main top portion 27 is a seat 30 serving as the rear seat of the automobile, when the rear body section 16 and the top are in the positions which the same occupy when the automobile is used as a coupé or landaulet, as shown in Figs. 1, 4 and 5.

When the top is in use, as is the case when the automobile is used as a landaulet or as a coupé (see Figs. 1, 4 and 5), the side portions 28 and roof portion 29 are in their extended or opened positions, and form continuations of the sides and roof of the main top portion 27. The side portions 28 also serve as door frames and are provided with hinged door members 31 which register with the rear doors 20, when the automobile is used as a landaulet (see Figs. 1 and 4), and which register with the front doors 19 when the automobile is used as a coupé (see Fig. 5). In order to lock the side portions 28 of the top to the roof portion 29 thereof in their extended or open positions, suitable fastening means are provided, substantially of the type illustrated in Figs. 4, 5 and 8 comprising perforated lugs 32 secured to the roof portion 29, adapted to be engaged by spring-pressed bolts 33 carried by the side portions 28 adjacent their upper edges. Similar lugs 35 secured to the lower edges of the side portions 28 are adapted to engage similarly arranged spring-pressed bolts 36 secured to the side walls of the main body section 15 in rear of the seats 25 when the automobile is used as a landaulet, in order to hold the top in position. The bolts 36 (Fig. 12) are pivotally supported upon the side walls of the body and are adapted to fold into recesses 36', formed therein, in order to permit of the top being folded into the body. When the automobile is used as a coupé, the lugs 35 are adapted to engage similarly arranged spring-pressed bolts 37 secured to the side walls of the main body section 15 in front of the seats 25.

The door members 31 of the side portions 28 of the top are provided with bolts 38 adapted to engage and form locking connection with bolts 39 secured to the rear doors 20 or with bolts 40 secured to the front doors 19, depending upon whether the automobile is used as a landaulet or coupé, in order to lock the door members 31 either with the rear doors 20 or the front doors 19.

When the automobile is used as a runabout the side portions 28 of the top are folded inwardly with respect to said main top portion 27, and the roof portion 29 thereof is folded downwardly with respect thereto, as indicated in Fig. 8, so that, upon rotating the rear section 16 in a forward direction the top will be received within the main section 15 of the body of the automobile in rear of the front seats 25 (see Fig. 2).

Mounted upon the cowl of the automobile body is a wind shield 41, of any approved type, which serves as a protection to the persons occupying the front seats 25. When the automobile is used as a coupé, the wind shield 41 serves as a front wall for the top. The front edges of the side portions 28 are curved, as shown in Fig. 8, in order to register accurately with, and engage the vertical edges of the wind shield 41. Secured to the upper horizontal member of the frame of the wind shield 41 are spring-pressed bolts 42 of the type heretofore described adapted to engage perforated lugs 43 secured to the roof portion 29 of the top adjacent the front edge thereof.

Slidingly mounted in guideways 44 secured to the backs of the seats 25 are wind shield sections 45, which are adapted to be raised in order to form the front wall of said top so as to protect the occupants of the rear compartment from the weather when the automobile is used as a landaulet. The wind shield sections 45 are provided with bolts 46, of the type above described, adapted to engage the lugs 43 carried by the front edge of the roof portion 29 whereby they may be locked in their raised positions.

The automobile may be converted from any one of the types to any other thereof as follows:—

Assuming the automobile to be used as a runabout, the parts are in the position shown in Fig. 2 as hereinabove described. If it is desired to use the automobile as a landaulet, the rear section 16 of the body is rotated in a rearward direction through an angle of ninety degrees, thereby lifting the top from within the body, as indicated in Fig. 3 in which the rear section 16 is shown as having been rotated for about one-half of the necessary distance. After the rear section 16 has been rotated the entire distance, the side portions 28 of the top, and the roof portion 29 are moved into their extended positions (see Figs. 1 and 4), and the parts are locked in place by the locking means as above described. In this position of the top access may be had to the rear compartment by opening either one of the rear doors 20 and the corresponding door member 31 which is in register therewith and locked thereto as above described. If desired, the wind shield 45 may be raised, thereby entirely enclosing the rear compartment.

To convert the automobile from a landaulet into a coupé it is merely necessary to rotate the rear section 16 in a forward direction, through an angle of ninety degrees, the top being maintained in its extended or open position and permitted to rotate about the hinged connection with the rear section 16 whereby it will be carried forward into the position shown in Fig. 5. Access to the interior of the coupé may be had by opening either one of the front doors 19 and the corresponding one of the door members 31 which are now in register and locked to the front doors. By moving one of the front seats 25 forwardly access may be had to the rear seat 30 from the front compartment.

The automobile may be converted from a coupé to a landaulet or to a runabout, or from a landaulet to a runabout by reversing the operations above described.

Having thus described my said invention, what I claim and desire to secure by Letters Patent is:—

1. A convertible automobile body comprising a fixed main section, a rear section movable with respect thereto, and a rigid non-foldable top portion attached to said rear section and adapted to occupy a plurality of adjusted positions when said rear section is in one of its adjusted positions, substantially as specified.

2. A convertible automobile body comprising a fixed main section, a rear section movable with respect thereto, and a rigid, non-foldable top portion attached to said rear section and adapted to form an enclosure for a part of said body or to be folded within said main section when said rear section is in one of its adjusted positions, substantially as specified.

3. A convertible automobile body comprising a fixed main section provided with seats, a rear section movable with respect to said main section, and a top attached to said rear section and adapted to serve as an enclosure for said seats or to be folded within said main section in rear of said seats, substantially as specified.

4. A convertible automobile body comprising a fixed main section, a rear section, movable with respect to said main section, front and rear seats, and a top attached to said rear section and adapted to form an enclosure for said front and rear seats or for said rear seats only, substantially as specified.

5. A convertible automobile body comprising a fixed main section provided with a seat, a rear section movable with respect to said main section and adapted to occupy a plurality of adjusted positions, a seat operatively associated with said rear section and adapted to be positioned for use when said rear section is in either of its adjusted positions, and a top attached to said rear section, said top forming an enclosure for both of said seats, when said rear section is in one of its adjusted positions and forming an enclosure for said rear seat only when said rear section is in the other of its adjusted positions, substantially as specified.

6. A convertible automobile body comprising a fixed main section, a rear section movable with respect thereto, and a top attached to said rear section; said top comprising a rigid, non-foldable main portion, and side portions and a roof portion foldably secured to said main portion, substantially as specified.

7. A convertible automobile body comprising a fixed main section, a rear section movable with respect thereto, a top attached to said rear section; said top comprising a rigid non-foldable main portion, and side portions and a roof portion foldably secured to said main portion, and means for locking said side portions and said roof portion in their extended positions, substantially as specified.

8. A convertible automobile body comprising a fixed main section, a rear section movable with respect thereto, a top attached to said rear section; said top comprising a rigid, non-foldable main portion, and side portions and a roof portion foldably secured to said main portion, and coacting locking means carried by said side portions and said roof portion for locking them in their extended positions, substantially as specified.

9. A convertible automobile body comprising a fixed main section, a rear section movable with respect thereto, a top attached to said rear section; said top comprising a main portion, and side portions and a roof portion foldably secured to said main portion, perforated lugs carried by said roof portion, and bolts carried by said side portions adapted to engage said lugs to lock said side portions to said roof portion when in their extended positions, substantially as specified.

10. A convertible automobile body comprising a fixed main section, a rear section movable with respect thereto, a top attached to said rear section; said top comprising a main portion having side walls and a roof, and side portions and a roof portion foldably secured to said main portion, said side portions and said roof portion in their extended positions forming continuations of the side walls and roof of said main portion, and means for locking said side portions and said roof portion in their extended positions, substantially as specified.

11. A convertible automobile body comprising a fixed main section, a rear section movable with respect thereto, a top attached to said rear section; said top comprising a main portion, and side portions and a roof portion foldably secured to said main portion, means for locking said side to said roof portion when in their extended positions, and means for locking said side portions to the side walls of said main body section, substantially as specified.

12. A convertible automobile body comprising a fixed main section, a rear section movable with respect thereto, a top attached to said rear section and adapted to serve as an enclosure for a part of, or the whole of said body, and means for locking said top to the side walls of said main section when in either of its positions, substantially as specified.

13. A convertible automobile body comprising a fixed main section provided with doors, a rear section movable with respect to said main section, and a top, said top comprising a main portion attached to said rear section, and side portions and a roof portion foldably secured to said main portion, said side portions being provided with door members adapted to register with said doors of said main section when said side portions are in their extended positions, substantially as specified.

14. A convertible automobile body comprising a fixed main section provided with doors, a rear section movable with respect to said main section, and a top; said top comprising a main portion attached to said rear section, and side portions and a roof portion foldably secured to said main portion, said side portions being provided with door members adapted to register with said doors of said main section when said side portions are in their extended positions, and means to lock said door members to said doors, substantially as specified.

15. A convertible automobile body comprising a fixed main section provided with doors, a rear section movable with respect to said main section, and a top; said top comprising a main portion attached to said rear section, and side portions and a roof portion foldably secured to said main portion, said side portions being provided with door members adapted to register with the doors of said main section when said side portions are in their extended positions, means to lock said side portions to the walls of said main section, and means to lock said door members to said doors, substantially as specified.

16. A convertible automobile body comprising a fixed main section provided with front and rear doors, a rear section movable with respect to said main section to occupy a plurality of positions with respect thereto, and a top attached to said rear section and comprising door members adapted to register with either the front doors or the rear doors of said main section, depending upon the position of said rear section, substantially as specified.

17. A convertible automobile body comprising a fixed main section provided with front and rear doors, a rear section movable with respect to said main section to occupy a plurality of positions with respect thereto, a top attached to said rear section and comprising door members adapted to register with either the front doors or the rear doors of said main section, depending upon the position of said rear section, and means to lock said door members to said front or rear doors, substantially as specified.

18. A convertible automobile body comprising a fixed main section, a rear section movable with respect to said main section, a top secured to said rear section and adapted to occupy a forward or rearward position depending upon the position of said rear section, a windshield carried by said main section adapted to serve as a front wall for said top when the same is in its forward position, and means to serve as a front wall for said top when the same is in its rearward position, substantially as specified.

19. A convertible automobile body comprising a fixed main section, a rear section movable with respect to said main section, a top secured to said rear section and adapted to occupy a forward or rearward position depending upon the position of said rear section, a windshield carried by said main section adapted to serve as a front wall for said top when the same is in its forward position, and means movably supported by said main section to serve as a front wall for said top when the same is in its rearward position, substantially as specified.

20. A convertible automobile body comprising a fixed main section, a rear section movable with respect to said main section, a top secured to said rear section and adapted to occupy a forward or rearward position depending upon the position of said rear section, a wind-shield carried by said main section adapted to serve as a front wall for said top when the same is in its forward position, and wall-members movably supported by said main section to serve as a front wall for said top when the same is in its rearward position, substantially as specified.

21. A convertible automobile body comprising a fixed main section provided with seats, a rear section movable with respect to said main section, a top secured to said rear section and adapted to occupy a forward or rearward position depending upon the position of said rear section, a wind-shield carried by said main section adapted to serve as a front wall for said top when the same is in its forward position, and wall-members movably attached to the backs of said seats to serve as a front wall for said top when the same is in its rearward position, substantially as specified.

22. A convertible automobile body comprising a fixed main section, a rear section movable with respect thereto, a rigid, non-foldable top portion attached to said rear section and adapted to occupy a plurality of adjusted positions, and a seat carried by said top portion, substantially as specified.

23. A convertible automobile body comprising a fixed main section provided with seats, a rear section movable with respect to said main section into a plurality of adjusted positions, and a seat operatively associated with said rear section and movable with respect thereto, said seat being adapted to occupy an operative position when said rear section is in one of its adjusted positions, and being adapted to occupy either an operative or an inoperative position when said rear section is in another of its adjusted positions, substantially as specified.

24. A convertible automobile body comprising a fixed main section provided with seats, a rear section movable with respect to said main section into a plurality of adjusted positions, and a seat operatively associated with said rear section and adapted to be positioned for use in rear of said first mentioned seats when said rear section is in either of its adjusted positions, substantially as specified.

25. A convertible automobile body comprising a fixed main section provided with seats, said seats being movable longitudinally with respect thereto, a rear section movable with respect to said main section into a plurality of adjusted positions, and a seat operatively associated with said rear section and adapted to be positioned for use in rear of said first-mentioned seats when said rear section is in either one of its adjusted positions, substantially as specified.

26. A convertible automobile body comprising a fixed main section provided with seats, a rear section movable with respect to said main section into a plurality of adjusted positions, a seat operatively associated with said rear section and adapted to be positioned for use in rear of said first-mentioned seats when said rear section is in either of its adjusted positions, and a top secured to said rear section and adapted to serve as an enclosure for said rear seats when said rear section is in either of its adjusted positions, substantially as specified.

27. A convertible automobile body comprising a fixed main section provided with seats, a rear section movable with respect to said main section into a plurality of adjusted positions, a seat operatively associated for use in rear of said first-mentioned seats when said rear section is in either of its adjusted positions, and a top secured to said rear section, said top serving as an enclosure for said rear seat when said rear section is in one of its adjusted positions, and serving as an enclosure for said rear seats and said first-mentioned seats when said rear section is in the other of its adjusted positions, substantially as specified.

28. In an automobile the combination with a chassis, of a convertible body comprising a main section fixed to said chassis and a rear section rotatably supported upon said chassis, the side walls of said sections being provided with co-acting arc-shaped tongues and recesses, substantially as specified.

29. In an automobile, the combination with a chassis, of a convertible body comprising a main section fixed to said chassis, and a rear section rotatably supported upon said chassis; the side walls of said main section being provided with arc-shaped recesses at their rear ends, and the side walls of said rear section being provided with outwardly-extending circular portions rotatably engaging said arc-shaped recesses, substantially as specified.

30. In an automobile, the combination with a chassis, of a convertible body comprising a main section fixed to said chassis, and a rear section rotatably supported upon said chasis; the side walls of said main section being provided with arc-shaped, grooved recesses at their rear ends, and the side walls of said rear section being provided with outwardly-extending circular portions provided with peripheral tongues rotatably engaging the grooves of said arc-shaped recesses, substantially as specified.

Signed at the city of New York, in the county and State of New York, this 26th day of December, one thousand nine hundred and seventeen.

BAZEL E. CARRM

Witnesses:
CONRAD A. DIETERICH,
WILLIAM P. JONES.